United States Patent [19]
Gong

[11] Patent Number: 6,044,467
[45] Date of Patent: Mar. 28, 2000

[54] SECURE CLASS RESOLUTION, LOADING AND DEFINITION

[75] Inventor: Li Gong, Menlo Park, Calif.

[73] Assignee: Sun Microsystems, Inc., Palo Alto, Calif.

[21] Appl. No.: 08/988,660

[22] Filed: Dec. 11, 1997

[51] Int. Cl.⁷ .................................................. G06F 11/00
[52] U.S. Cl. ........................................................ 713/200
[58] Field of Search .................................. 713/200, 201; 395/704; 380/4; 707/9, 103; 709/229

[56] References Cited

U.S. PATENT DOCUMENTS

| | | | |
|---|---|---|---|
| 5,311,591 | 5/1994 | Fischer | 380/4 |
| 5,692,047 | 11/1997 | McManis | 380/4 |
| 5,727,147 | 3/1998 | Van Hoff | 395/200.3 |
| 5,892,904 | 4/1999 | Atkinson et al. | 395/187.01 |
| 5,893,107 | 4/1999 | Chan et al. | 707/103 |
| 5,915,085 | 6/1999 | Koved | 395/186 |

FOREIGN PATENT DOCUMENTS

| | | | |
|---|---|---|---|
| 2259590A | 3/1993 | WIPO | G06F 9/44 |
| 2308688A | 7/1997 | WIPO | G06F 12/14 |

OTHER PUBLICATIONS

Dean, D., et al., "Java Security: From HotJava to Netscape and Beyond," Proceedings of the 1996 IEEE Symposium on Security and Privacy, Oakland, CA, May 6–8, 1996.

Hamilton, M.A., "Java and the Shift to Net–Centric Computing," Computer, vol. 29, No. 8, Aug., 1996.

Gong Li, et al.: "Going Beyond the Sandbox: An Overview of the New Security Architecture in the Java™ Development Kit 1.2", Proceedings of the Usenix Symposium on Internet Technologies and Systems, Monterey, CA, USA, 8–11 Dec. 1997, ISBN 1–880446–91–S, 1997, Berkeley, CA, USA, Usenix Assoc., USA, pp. 103–112, XP002100907.

Wallach, D. S., et al.: "Extensible Security Architectures for Java", 16th ACM Symposium on Operating Systems Principles, Sain Malo, France, 5–8 Oct. 1997, ISSN 0163–5980, Operating Systems Review, Dec. 1997, ACM, USA, pp. 116–128.

Primary Examiner—Robert W. Beausoliel, Jr.
Assistant Examiner—Scott T. Baderman
Attorney, Agent, or Firm—McDermott, Will & Emery

[57] ABSTRACT

A method and apparatus for providing security in a computer system is provided. When code associated with an object class must be loaded, a search for the code is performed, inspecting locations in predetermined sequence, where the sequence ensures that untrusted code can not be loaded in place of trusted code. The sequence of locations may include locations specified by a user as well as locations specified by a default pathway. If the class is found and the class has not been loaded, the class is loaded and a set of permissions is associated with the class based on a predetermined mapping of code sources to permissions.

21 Claims, 7 Drawing Sheets

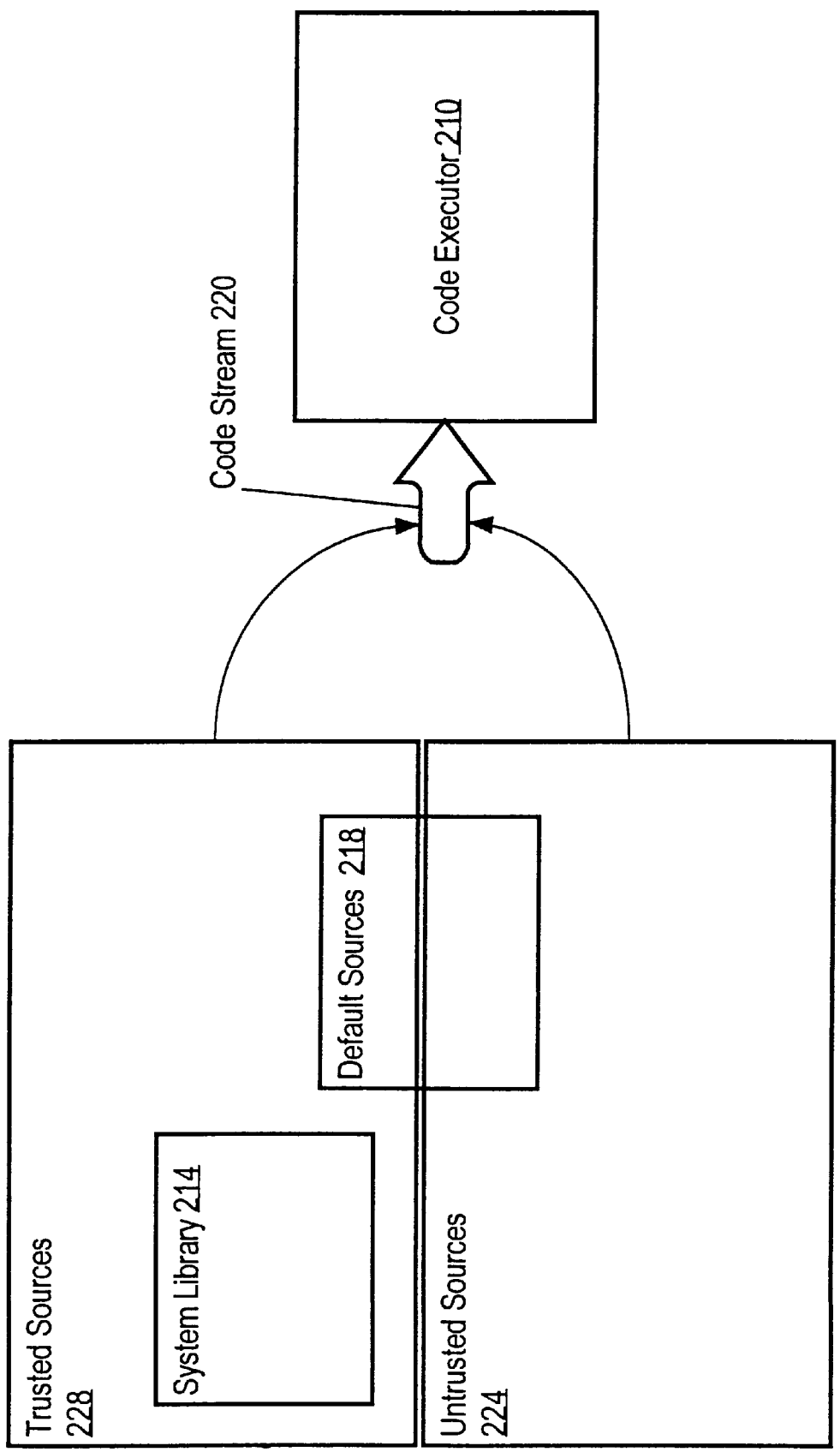

Policy File 244

| URL | Key | Action | Target | |
|---|---|---|---|---|
| file://somesource | somekey | write | /tmp/* | 420-1 |
| file://bank | clerk | write | /tmp/* | 420-2 |
| file://bank | * | write | /tmp/* | 420-3 |
| * | clerk | write | /share/* | 420-4 |
| * | * | write | /share/* | 420-5 |
| ⋮ | ⋮ | ⋮ | ⋮ | |
| http://www.source.com | lastkey | write | /tmp/* | |

Code Source: URL, Key
Permission: Action, Target

Instructions 420-1 to 420-P

Fig. 4

SECURE CLASS RESOLUTION, LOADING AND DEFINITION

RELATED APPLICATIONS

The present application is related to U.S. patent application Ser. No. 08/988,857, entitled "TYPED, PARAMETERIZED, AND EXTENSIBLE ACCESS CONTROL PERMISSIONS", filed by Li Gong, on the equal day herewith, (attorney docket no. 3070-006/P2243/TJC), the contents of which are incorporated herein by reference.

The present application is related to U.S. patent application Ser. No. 08/988,431, entitled "CONTROLLING ACCESS TO A RESOURCE", filed by Li Gong, on the equal day herewith, (attorney docket no. 3070-007/P2244/TJC), the contents of which are incorporated herein by reference.

The present application is related to U.S. patent application Ser. No. 08/988,439, entitled "PROTECTION DOMAINS TO PROVIDE SECURITY IN A COMPUTER SYSTEM", filed by Li Gong, on the equal day herewith, (attorney docket no. 3070-009/P2435/TJC), the contents of which are incorporated herein by reference.

FIELD OF THE INVENTION

The present invention relates to providing security in a computer system.

BACKGROUND OF THE INVENTION

As the use of computer systems grows, organizations are becoming increasingly reliant upon them. A malfunction in the computer system can severely hamper the operation of such organizations. Thus organizations that use computer systems are vulnerable to users who may intentionally or unintentionally cause the computer system to malfunction.

One way to compromise the security of a computer system is to cause the computer system to execute software that performs harmful actions on the computer system. There are various types of security measures that may be used to prevent a computer system from executing harmful software. One example is to check all software executed by the computer system with a "virus" checker. However, virus checkers only search for very specific software instructions. Many methods of using software to tamper with a computer's resources would not be detected by a virus checker.

Another very common measure used to prevent the execution of software that tampers with a computer's resources is the "trusted developers approach". According to the trusted developers approach, system administrators limit the software that a computer system can access to only software developed by trusted software developers. Such trusted developers may include, for example, well know vendors or in-house developers.

Fundamental to the trusted developers approach is the idea that computer programs are created by developers, and that some developers can be trusted to not have produced software that compromises security. Also fundamental to the trusted developers approach is the notion that a computer system will only execute programs that are stored at locations that are under control of the system administrators.

Recently developed methods of running applications involve the automatic and immediate execution of software code loaded from remote sources over a network. When the network includes remote sources that are outside the control of system administrators, the trusted developers approach does not work.

One attempt to adapt the trusted developers approach to systems that can execute code from remote sources is referred to as the sand box method. The sand box method allows all code to be executed, but places restrictions on remote code. Specifically, the sand box method permits all trusted code full access to a computer system's resources and all remote code limited access to a computer system's resources. Trusted code is usually stored locally on the computer system under the direct control of the owners or administrators of the computer system, who are accountable for the security of the trusted code.

One drawback to the sandbox approach is that the approach is not very granular. The sandbox approach is not very granular because all remote code is restricted to the same limited set of resources. Very often, there is a need to permit remote code from one source access to one set of computer resources while permitting remote code from another source access to another set of computer resources. For example, there may be a need to limit access to one set of files associated with one bank to remote code loaded over a network from a source associated with that one bank, and limit access to another set of files associated with another bank to remote code loaded over a network from a source associated with the other bank.

Providing security measures that allow more granularity than the sand box method involves establishing a complex set of relationships between principals and permissions. A "principal" is an entity in the computer system to which permissions are granted. Examples of principals include processes, objects and threads. A "permission" is an authorization by the computer system that allows a principal to perform a particular action or function.

When code is received for a particular source, the set of permissions appropriate for the security of the computer system must be assigned to the code. If a set of permissions inappropriate for the security of the computer system is assigned to the code, the integrity and security of the computer system's resources may be compromised. For example, a routine from the trusted source may perform security sensitive operations and use security mechanisms to ensure secure performance of such operations. Thus, it is appropriate to grant to that routine permissions that allow access sensitive resources. On the other hand, a routine from an untrusted source should not be granted those same permissions.

Like most software, code from trusted sources and remote sources contain identifiers (i.e. names) used to identify entities such as routines, functions, methods, or classes. The identifiers within code are used, for example, to identify a called routine when one routine calls another routine.

Unfortunately, some identifiers contained in remote code from one remote source may be identical to identifiers in remote code from another remote source, or identical to identifiers in trusted code. Further, it is possible that a routine contained in code from a remote source may be deliberately named with the same identifier used for a routine contained in a trusted source in the hopes that the computer executing the routine will erroneously grant the routine the same rights as the routine with the same identifier provided by the trusted source.

When the same identifier is used for routines from more than one source, an ambiguity arises as to which routine is being specified. If the wrong routine is invoked, security mechanisms may be averted and the security of a computer system's resources may be compromised.

Based on the foregoing, it is clearly desirable to provide a system and method for assigning permissions to code from various sources appropriate for the security of the computer system executing the code. It is further desirable to provide a mechanism for resolving ambiguities among identifiers used in code in a manner that ensures the security of the computer system.

SUMMARY OF THE INVENTION

A method and apparatus for providing security in a computer system is provided that resolves ambiguities in a manner that prevents the security of the computer system from being compromised. According to one aspect of the invention, when data identifying a class must be loaded into a computer system, a search is performed for the code associated with the class. The one or more sources of code to be searched are searched in a predetermined sequence in a way that ensures that untrusted code will not be executed when trusted code with the same class name is available. If, during the search, the class is found and the class has not been loaded, the class is loaded and a set of permissions is associated with the class based on a predetermined mapping of source(s) of code to permissions. A "source of code" is an entity from which computer instructions are received. Examples of sources of code include a file or persistent object stored on a data server connected over a network, a FLASH_EPROM reader that reads instructions stored on a FLASH_EPROM, or a set of system libraries.

According to another aspect of the invention, if the source of code of a class is not associated with a public cryptographic key, a default key is assigned to the class. If any source(s) of code in the predetermined mapping match the source of code of the class for which a search is being performed, then the class is assigned all or some of the permissions mapped to the source(s) of code that match the source of code of the class. Otherwise, the class is assigned a default set of permissions.

According to another aspect of the invention, when the search for a class begins, a determination is first made as to whether the class that has already been loaded. If the class is not loaded, the class is searched for in a first set of sources of code. A first method that cannot be overridden is invoked to perform the search for the class in the first set of sources of code. If the class is not found in the first set of sources of code, the class is searched for in second set of sources of code, by default or as specified by a user. A second method that can be overridden by a user is invoked to search for the class in the second set of sources of code.

According to another aspect of the invention, a determination of whether the class is loaded and the search for the class in the first set of sources of code is performed by executing a first method whose implementation is defined by a super class. The implementation of the first method may not be overridden. The search for the class in the second set of sources of code is performed by invoking a second method defined by a subclass of the super class. The second method is invoked by the first method.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A is a block diagram showing a code executor executing code from trusted sources and untrusted sources in accordance with one embodiment of the present invention;

FIG. 4 is a block diagram showing an exemplary policy file in accordance with one embodiment of the present invention;

DETAILED DESCRIPTION OF THE PREFERRED EMBODIMENT

A method and apparatus are provided for choosing the set of permissions that should be assigned to object classes, and that resolve ambiguities between object classes in a way the ensures the integrity of the system. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
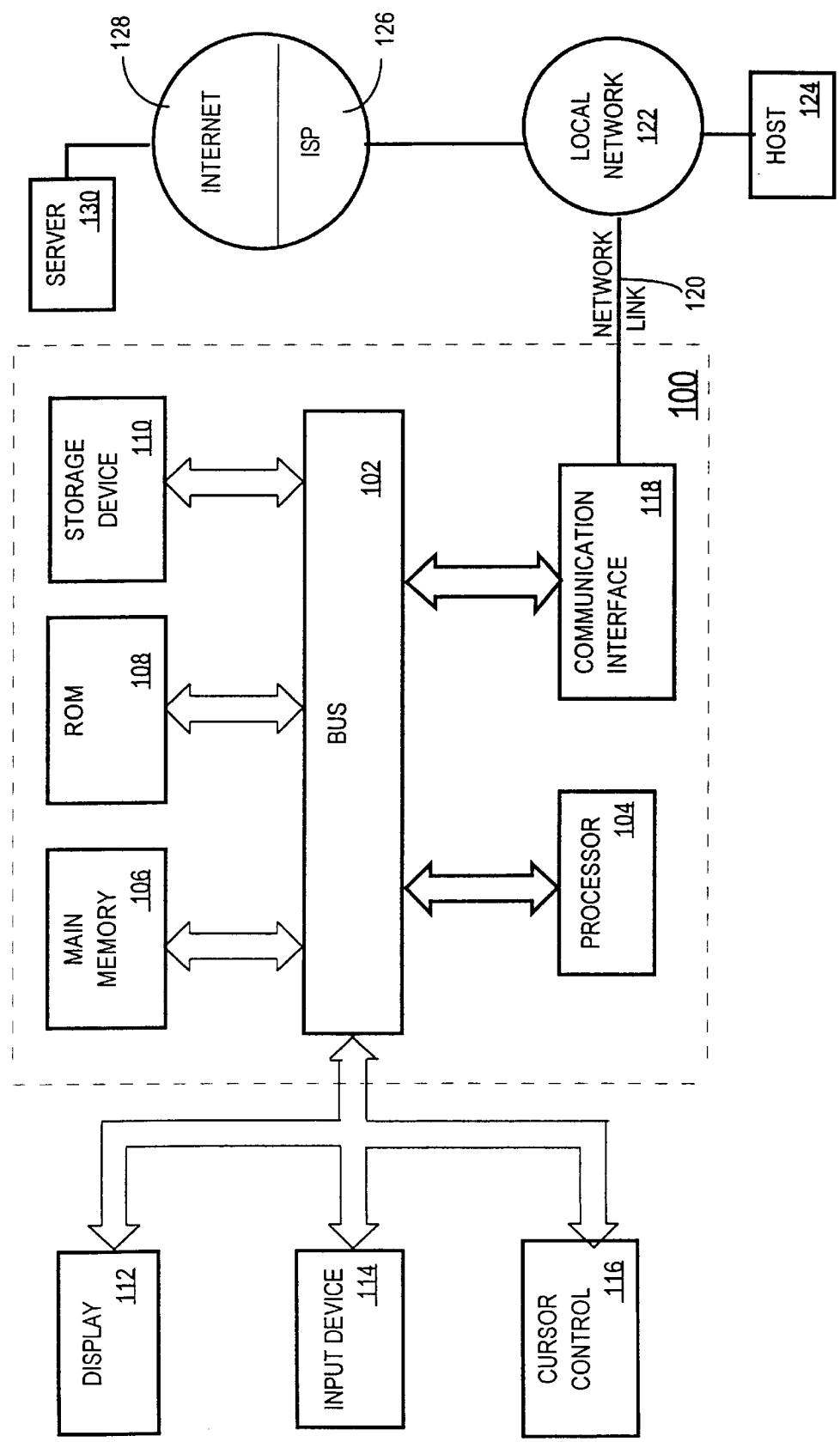
FIG. 1 is a block diagram of a computer system on which the present invention may be implemented in accordance with one embodiment of the present invention.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for choosing protection domains and resolving classes.

According to one embodiment of the invention, the choosing of protection domains and resolving classes is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for choosing protection domains and resolving classes as described herein.

The received code may be executed by processor 104 as it is received, and/or stored in storage device 110, or other non-volatile storage for later execution. In this manner, computer system 100 may obtain application code in the form of a carrier wave.

FUNCTIONAL OVERVIEW

A method and apparatus are provided for finding the code for object classes, and assigning permissions to the code, in a way that ensures the integrity of the computer system that may execute the code. Specifically, when an object class must be loaded into a computer system, a search is performed for the code associated with the class. The locations to be searched are searched in a predetermined sequence in a way that ensures that untrusted code will not be executed when trusted code with the same class name is available. If, during the search, the class is found and the class has not been loaded, the class is loaded and a set of permissions is associated with the class based on a predetermined mapping of code sources to permissions.

If the code source of a class is not associated with a public cryptographic key, a default key is assigned to the class. If any code sources in the predetermined mapping match the code source of the class for which a search is being performed, then the class is assigned all or some of the permissions mapped to the code sources that match the code source of the class. Otherwise, the class is assigned a default set of permissions.

According to one aspect of the invention, a first method that cannot be overridden is invoked to perform the search for a class in the first set of locations. The first set of locations typically includes the locations that contain critical routines that should not be circumvented by or replaced by other code. If the class is not found in the first set of locations, the class is searched for in second set of locations, by default or as specified by a user. A second method that can be overridden by a user is invoked to search for the class in the second set of locations.

According to one embodiment of the invention, the security mechanism provided herein is used in conjunction with code executed by a code executor. The permissions associated with the various code are organized within and represented by various data structures including protection domain objects and permission objects. The code executor, protection domain objects and permission objects shall be described in detail hereafter.

EXEMPLARY SECURITY MECHANISM

An exemplary security mechanism illustrating the use of protection domains is shown in FIG. 2A. Referring to FIG. 2A, the exemplary security mechanism includes a policy file 244, a policy object 240, a domain mapper object 248, an access controller 280, and one or more protection domains 282. The security mechanism is implemented using a code executor 210.

Code executor 210 executes code which code executor 210 receives from code stream 220. One example of a code executor is a Java virtual machine. A Java virtual machine interprets code called byte code. Byte code is code generated by a Java compiler from source files containing text. The Java virtual machine is described in detail in Tim Lindholm & Frank Yellin, *The Java Virtual Machine Specification* (1996).

For the purposes of explanation, it shall be assumed that code from code stream 220 is object oriented software. Consequently, the code is in the form of methods associated with objects that belong to classes. In response to instructions embodied by code executed by code executor 210, code executor 210 creates one or more objects 240. An object is a record of data combined with the procedures and functions that manipulate the record. All objects belong to a class. Each object belonging to a class has the same fields ("attributes") and the same methods. The methods are the procedures, functions, or routines used to manipulate the object. An object is said to be an "instance" of the class to which the object belongs.

One or more class definitions are contained in code from code stream 220. The fields and methods of the objects belonging to a class are defined by a class definition. These class definitions are used by code executor 210 to create objects which are instances of the classes defined by the class definitions.

These class definitions are generated from source code written by a programmer. For example, a programmer using a Java Development Kit enters source code that conforms to the Java programming language into a source file. The source code embodies class definitions and other instructions which are used to generate byte code which controls the execution of a code executor (i.e. a Java virtual machine). Techniques for defining classes and generating code executed by a code executor, such as a Java virtual machine, are well known to those skilled in the art.

Each class defined by a class definition from code stream 220 is associated with a class name 238 ("identifier") and a code source 236. The class definition contains information used to specify the class name associated with a class. The code source represents a source of code from which is code received, such as a particular set of one or more files or code stream from a trusted source or untrusted source. Code executor 210 maintains an association between a class and its class name and code source.

The code source may be a composite record containing a uniform resource locator ("URL") 234 and set of public cryptographic keys 236. A URL identifies a particular source. The URL is a string used to uniquely identify any server connected to the world wide web. A URL may also be used to designate sources local to computer system 100. Typically, the URL includes the designation of the file and directory of the file that is the source of the code stream that a server is providing.

A public cryptographic key, herein referred to as a key, is used to validate the digital signature which may be included in a file used to transport related code and data. Public cryptographic keys and digital signatures are described in Schneier, *Applied Cryptography*, (1996). The keys may be contained in the file, may be contained in a database associating keys with sources (e.g. URLs), or be accessible using other possible alternative techniques.

A class may be associated with the digital signature associated with the file used to transport code defining the class, or the class definition of the class may be specifically associated with a digital signature. A class that is associated with a valid digital signature is referred to as being signed. Valid digital signatures are digital signatures that can be verified by known keys stored in a database. If a class is associated with a digital signature which can not be verified, or the class is not associated with any digital signature, the class is referred to as being unsigned. Unsigned classes may be associated with a default key. A key may be associated with a name, which may be used to look up the key in the database.

While one code source format has been described as including data indicating a cryptographic key and URL, alternate formats are possible. Other information indicating the source of the code, or combinations thereof, may be used to represent code sources. Therefore, it is understood that the present invention, is not limited to any particular format for a code source.

TRUSTED AND UNTRUSTED SOURCES

The source of code stream 220 may be from zero or more untrusted sources 224 or zero or more trusted sources 228. Untrusted sources 224 and trusted sources 228 may be file servers, including file servers that are part of the World Wide Web network of servers connected to the Internet. An untrusted source is typically not under the direct control of the operators of computer system 100. Code from untrusted sources is herein referred to as untrusted code.

Because untrusted code is considered to pose a high security risk, the set of computer resources that untrusted code may access is usually restricted to those which do not pose security threats. Code from a trusted source is code usually developed by trusted developers. Trusted code is considered to be reliable and pose much less security risk than remote code.

Software code which is loaded over the network from a remote source and immediately executed is herein referred to as remote code. Typically, a remote source is a computer system of another separate organization or individual. The remote source is often connected to the Internet.

Normally untrusted code is remote code. However, code from sources local to computer system 100 may pose a high security risk. Code from such local sources may be deemed to be untrusted code from an untrusted source. Likewise, code from a particular remote source may be considered to be reliable and to pose relatively little risk, and thus may be deemed to be trusted code from a trusted resource.

RESOLVING CLASSES

In systems that allow code from untrusted sources to be executed, the security enforcement involves various phases. Specifically, the security mechanism must (1) load code from the correct source, (2) determine the appropriate permissions for the code, and then (3) enforce the permissions while the code is executing.

The phase of loading the appropriate code is complicated by the fact that classes that need to be loaded are typically identified by class name, and two sets of code may have the same class name. The process of determining which set of code to load given a particular class name is referred to herein as resolving classes.

When an object is to be created, the particular class to which the object belongs is specified by using the class name to identify the particular class. Sometimes, two or more classes may share the same name. If the class name used to specify the class identifies more than one class, an ambiguity arises with respect to which class is being specified. A name conflict is said to exist when one class from a given set of classes shares the same name of anther class.

Name conflicts create potential security risks. For example, code executed by code executor 210 can only access computer resources on computer system 200 through objects belonging to system classes. System classes are classes from system library 214 shown in FIG. 2A. An example of a system class is a system class used to create an object to access a file. It is possible that a class from a different source other than the system library is deliberately named to be identical to the name of a system class. Without a secure method of resolving ambiguous class names, the class from a different source other than the system library may be used to create the object. The consequence of this is that code from any source can be used to circumvent the security mechanisms and access a computers resource.

Figure 5:
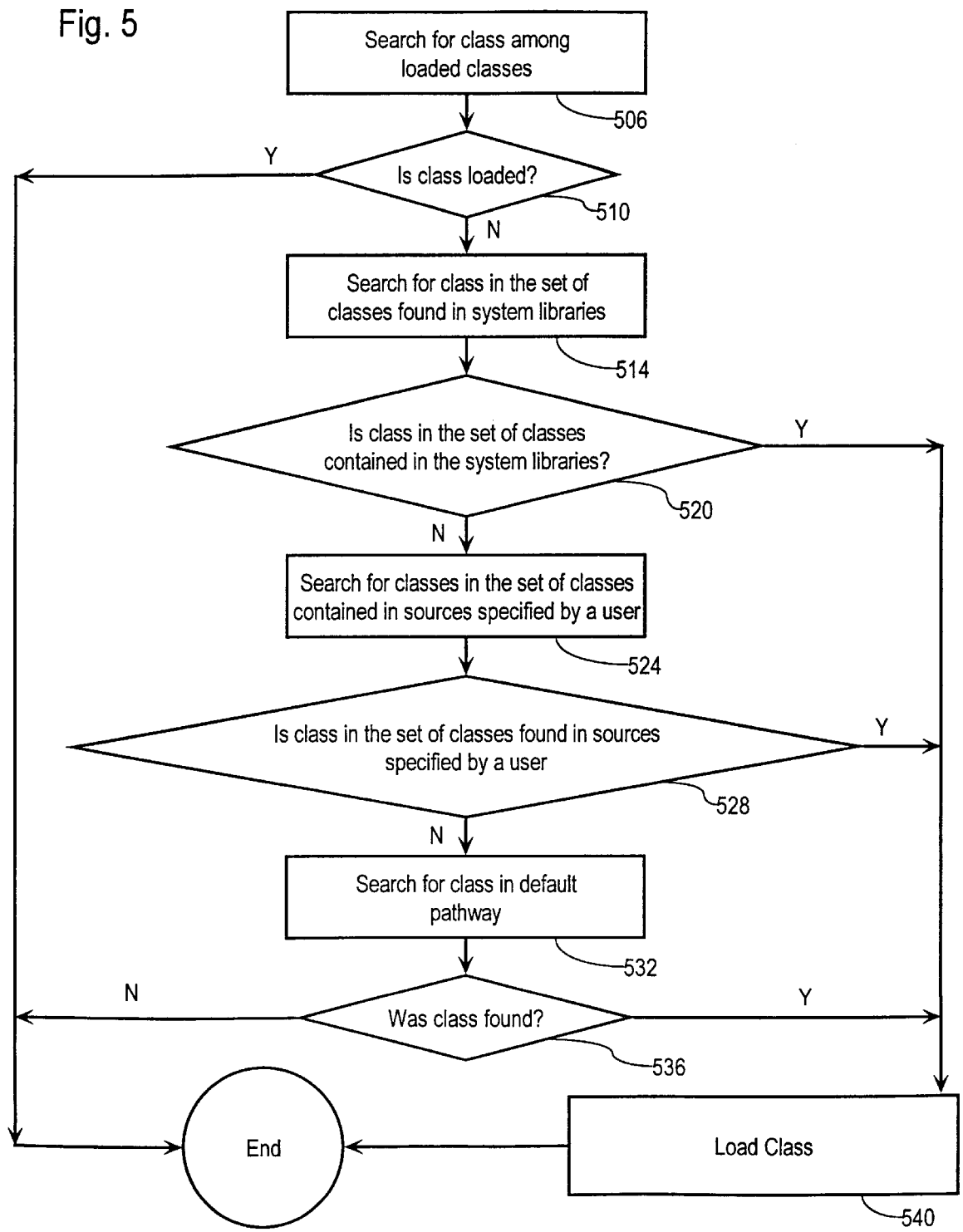
FIG. 5 is a flow chart showing steps for resolving classes in accordance with one embodiment of the present invention.

FIG. 5 shows the steps of a method for determining from where to retrieve the code for a class ("resolving a class"). The steps are performed when a class is loaded. The process of retrieving code associated with a class is generally referred to as class loading. Class loading may be initiated in response to receipt or execution of code that refers to an object of a class that has not yet been encountered. When a class is to be loaded, a search is performed for the code defining the class (i.e. the class definition).

A search for a class definition associated with a given class name in a set of sources is referred to as a search for a class. When a class definition associated with a class name is found in a particular set of sources, the class defined by the class definition is said to be found in that particular set of sources. To ensure security, code executor 210 uses the class name of a class to search for the class in a particular sequence of sources.

Referring to FIG. 5, in step 506, a search is performed for the given class among the loaded classes. Code executor 210 maintains a list of loaded classes along with data representing the class name associated with each of the loaded classes. This list is searched for a class of the given class name.

In step 510, a determination is made of whether the class name was found. If the class name was not found, then control passes to step 510. If the class name was found, then performance of the steps end, and no class is loaded. Not reloading the class prevents any name conflicts among the loaded classes.

In step 514, a search is performed for the class in the system libraries. Configuration data used by code executor 210 indicates the location of sources of code comprising the system libraries. The libraries are searched for a class of the given class name.

In step 520, a determination is made of whether a class was found in the system libraries. If the class was not found in the system libraries, control passes to step 524. If the class was found, then control passes to step 540.

In step 540, the found class is loaded from the particular source in which the class was found. The classes are loaded from a particular source using functions, routines, and methods of objects well known to those skilled in the art.

Note that one feature of the method shown in FIG. 5 is that a class name is always resolved in favor of a system class. This prevents substituting a class definition in the system library with a class definition from outside the system library by simply associating the class definition outside the system library with the same class name as that of the system class. Thus the security measures contained in the system class definitions cannot be averted by simply substituting the system class definitions by associating a system class name with another class.

For example, assume that the system library contains a system class and class definition associated with a class name of FileInputStream, that code from untrusted sources 224 contains a class definition associated with the same name, and that a request is received to load a class with a class name of FileInputStream. At step 514, the class would be found in the system libraries. At step 520, th e de termination is that the class was found in the system libraries, thus control passes to step 540. In step 540, the system class would be loaded using the class definition found in the system library, rather than the class definition in untrusted sources 224.

The technique of resolving of a class name in favor of a particular code source is not limited to system classes. The feature can be adapted to resolving in favor of classes from any source.

In step 524, a search for a class of the given class name is performed in a set of classes specified by a user (e.g. programmer, code originator). A set of classes may be specified by a user using various techniques. For example, a method, routine, or procedure may be provided which, when invoked by code executor 210, searches in particular code locations in a particular order to find a class associated with the given class name.

Alternatively, a function or method may be provided for returning data to code executor 210 indicating a source to search for a class. For example, such a function may return to code executor 210*a* string representing a URL specifying a particular file on a server containing code defining a set of classes. If the code executor 210 fails to find the class in the loaded and system classes, the code executor may proceed to search for the class at the specified URL. It is understood that the present invention is not limited to a particular technique for a user specifying a particular source to search for a class of a given name.

In step 528, a determination is made of whether a class of the given class name was found in the set of classes specified by the user. If a class of the given class name was not found, then control passes to passes to step 532. Otherwise control passes to step 536.

In step 536, a search for a class of given class name in the default pathway is performed. The default pathway indicates one or more default sources 218, shown in FIG. 2A, in which to search for a class of a given name. Typically, default sources are files and directories on a local file system in computer system 100. Often, these files and directories contain class definitions of classes commonly used by applications being run by code executor 210, and which are not used to create objects performing operations entailing a high security risk.

Frequently, a class name conflict can exist between a class from a source specified in the default pathway and a class from any other source. Typically class name conflicts do not occur between system classes and other classes because system class names are well known. Associating a class name that conflicts with a system class name is easily and usually avoided. On the other hand, class names associated with classes from default sources are not as well known, and name conflicts are much more difficult to avoid and more likely to occur. Obviously, if the class from the default source is used to create an object, rather than a class from the intended source, the object would not behave (function) as designed and would cause errors.

To permit resolution of class name in favor of the class intended, sources that contain the intended class can be specified and searched before resorting to the default path sources. This prevents creation of object belonging to a class unintended by the user.

PROTECTION DOMAINS AND PERMISSIONS

Once the code for a specified class has been loaded from the appropriate location, the security mechanism determines the appropriate permissions for the code. According to an embodiment of the present invention, protection domain objects and permission objects are used to maintain and organize the sets of permissions associated with code.

A protection domain can be viewed as a set of permissions granted to one or more principals. A permission is an authorization by the computer system that allows a principle to execute a particular action or function. Typically, permissions involve an authorization to perform an access to a computer resource in a particular manner. An example of an authorization is an authorization to "write" to a particular directory in a file system (e.g./home).

A permission can be represented in numerous ways in a computer system. For example, a data structure containing text instructions can represent permissions. An instruction such as "permission write/somedirectory/somefile" denotes a permission to write to file "somefile" in the directory "/somedirectory." The instruction denotes which particular action is authorized, and the computer resource upon which that particular action is authorized. In this example, the particular action authorized is to "write." The computer resources upon which the particular action is authorized is a file ("/somedirectory/somefile") in a file system of computer system 100. Note that in the example provided the file and the directory in which the file is contained are expressed in a conventional form recognized by those skilled in the art.

Permissions can also be represented by objects, herein referred to as permission objects. Attributes of the object represent a particular permission. For example, an object can contain an action attribute of "write," and a target resource attribute of "/somedirectory." A permission object may have one or more permission validation methods which determine whether a requested permission is authorized by the particular permission represented by the permission object.

POLICIES

Figure 2B:
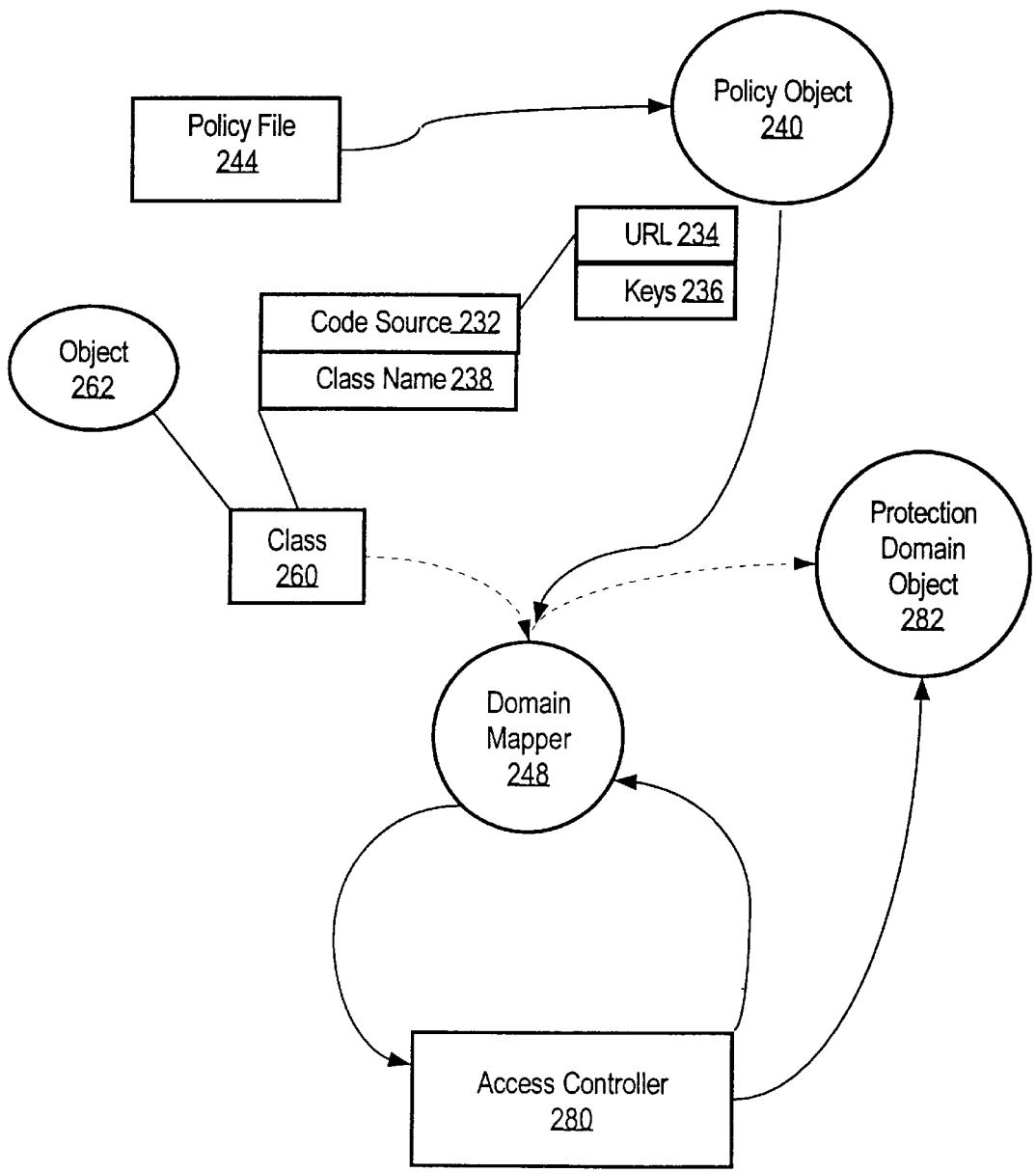
FIG. 2B is a block diagram showing a objects and files of a security mechanism in accordance with one embodiment of the present invention.

The correlation between permissions and principals constitutes the security policy of the system. FIG. 2B illustrates an exemplary policy implemented through use of a policy file 244 and protection domain object 282. A protection domain in this exemplary policy is defined as the set of permissions granted to the objects associated with a particular code source. The policy of the system is represented by one or more files containing instructions. The instructions map code sources to authorized permissions. Each instruction establishes a mapping between a particular code source and a particular authorized permission. An instruction represents one authorized permission for the objects belonging to the classes associated with the code source in the instruction. A code source that is mapped to a permission is referred to as a recognized code source.

Storing instructions in a file is just one method of representing the policy of the system with persistently stored data. Other methods are possible for representing the policy with persistent data. For example, data in a database system can be used to map code sources to authorized permissions, or attributes of a persistent object can be used to map code sources to authorized permissions.

FIG. 4 illustrates exemplary policy file 244. The format of an instruction in exemplary policy file 244 is:

<permission><URL><key name><action><target>

The <URL> and a key corresponding to the <key name> represent a code source; the <action> and <target> represent a permission. A key is associated with a key name. The key and the corresponding key name are stored together in a key database. The key name can be used to find the key in the key database. Instruction 420-1 in FIG. 4, for example, is therefore an authorization of a permission to write to any file in "/tmp/" by any object of the classes associated with code source "file://bank"—"clerk" (i.e. URL-key).

Access controller 280 is mechanism used to determine whether a particular action is authorized. Whenever the need to determine whether a particular action is authorized arises, a request to determine whether a particular action is authorized is transmitted to access controller 280. The access controller then determines whether the action is authorized based on the set of permissions contained by protection domains associated with the requestor of the action.

CHOOSING AND ESTABLISHING PROTECTION DOMAINS

Because a class is associated with a protection domain, a protection domain with which to associate a class must be chosen when the class is received by the code executor 210. In some situations, it may not be efficient for the policy specify permissions for every possible code source. Rather, it may be more efficient for the policy to specify permissions for groups of code sources. For example, it may be preferable for a policy to specify rules for code from a particular directory and all of subdirectories thereof without explicitly identifying all of the subdirectories.

When a policy specifies permissions for categories of code sources, it is possible for a single code source to fall into multiple categories. When such is the case, a mechanism must be provided for determining which of the possible permissions will apply to the site. Two techniques for making this determination, referred to herein as the "best match selection" and "all match selection" are described hereafter.

BEST MATCH SELECTION

One method of choosing a protection domain for a class is to choose a protection domain associated with a recognized code source that most specifically matches the code source associated with a class. For example, assume a given class is associated with code source having a URL "file://bank" and a key of "clerk". Furthermore, assume that the recognized code sources include those represented by exemplary instructions 420 in FIG. 4. Note that some fields in the instructions contain the character "*". The "*" character is a wild card symbol that logically represents that the symbol is matched by a string of any number of characters. Wild card symbols are well known to those skilled in the art.

Referring to FIG. 4, the code source represented by instruction 420-2, instruction 420-3, instruction 420-4, and instruction 420-5 each match the code source associated with the given class. The code source 420-2 is the most specific match, since the URL and key of code source 420-2 directly match both the URL and the key, respectively, of the code source of the received class. Thus the protection domain object that is chosen for the given class using a best match approach would be the protection domain object associated the code source represented by instruction 420-2.

Figure 3:
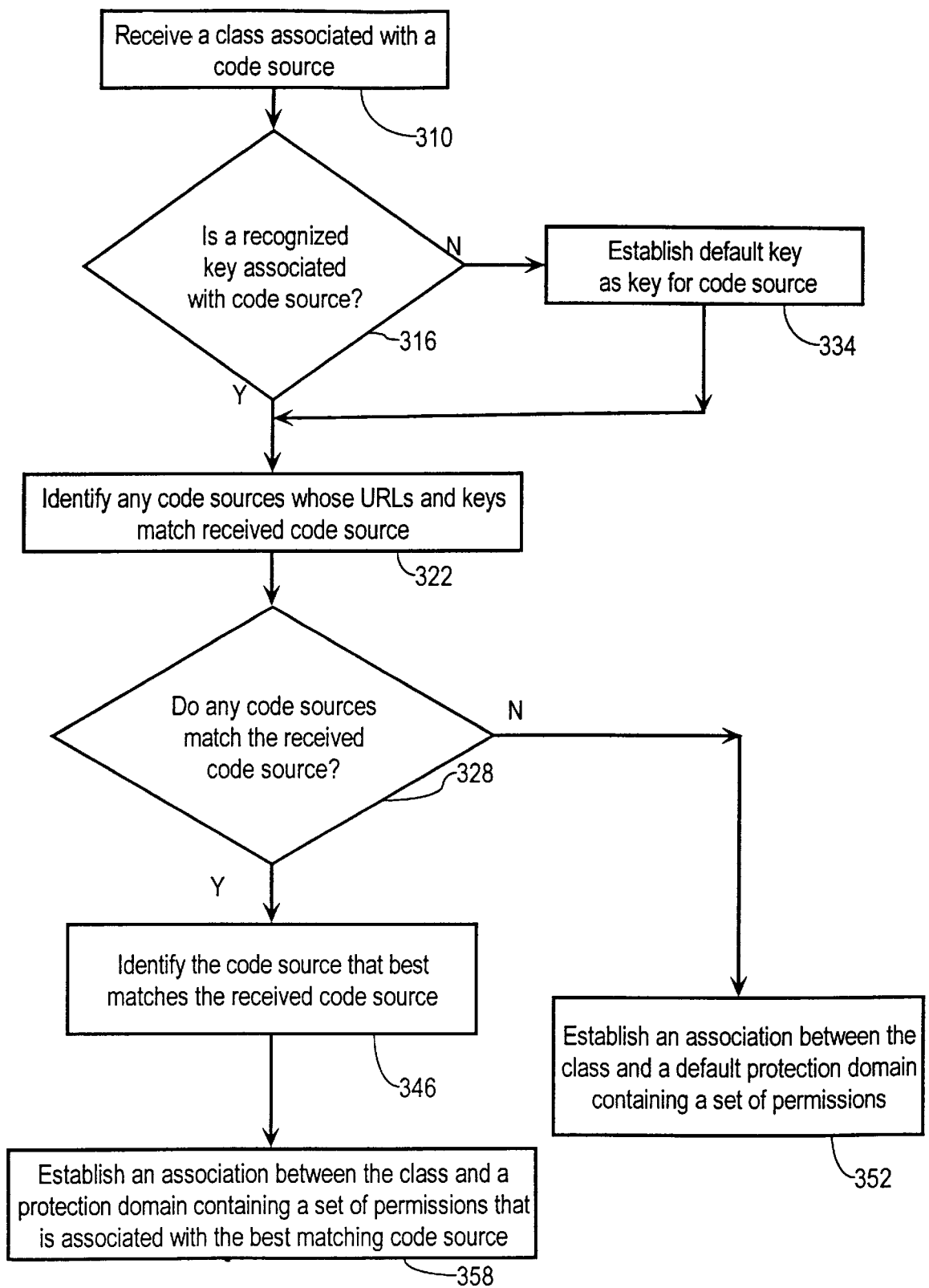
FIG. 3 is flow chart showing the steps performed for choosing a protection domain in accordance with one embodiment of the present invention.

FIG. 3 shows the steps of a method for choosing a protection domain associated with the code source that most specifically matches the code source of a class. The objects, classes, and files comprising the security mechanism shown in shown FIG. 2B and FIG. 4 will be used as examples to illustrate the performance of the steps shown in FIG. 3.

Referring to FIG. 2B, in order to efficiently and conveniently implement the policy and establish protection domains, policy object 240, domain mapper object 248 are provided. The policy object 240 and domain mapper 248 are initialized during the initialization of code executor 210. A protection domain object 282 is created in a manner which shall be described. When the domain mapper is initialized, each instruction in the policy file 244 is parsed to generate a list representation of the code source/permission combinations that together represent the policy. FIG. 4 shows exemplary instructions in policy file 244 that are used to illustrate the performance of the steps in FIG. 3.

In step 310, a class definition is received from code stream 220 by code executor 210. The class defined by a class definition received by the code executor 210 is herein referred to as the received class. Referring to FIG. 2B in the present example, assume that object 262 and protection domain object 282 have not yet been created, and that code executor 210 is receiving the class definition for the class 260. The code source associated with class 260 is "file://bank"—"clerk" (i.e. URL-key).

The code source associated with the received class is herein referred to as the received code source. The URL and key associated with the received code source are herein referred to as the received URL and received key, respectively. Assume for purposes of illustration, that a key and the corresponding key name are identical.

In step 316, a determination is made of whether a key is associated with the received code source. A code source of a class is associated with at least one key if its respective class is signed, and is not associated with a key if the respective class is unsigned. If the received code source is associated with a recognized key, then control passes to step 322. In this example, the received code source of object 262 is associated with key "clerk", thus control passes to step 322.

If the received code source is not a associated with any key, then control passes to step 322. In step 322, a default key is established as the received key. The default key is logically represented with the "*" wild card symbol.

Note that to map a code source that has a URL but has no key, the default key is used to represent the key name in an instruction in policy file 244. Any received code source that has a key that does not match any key in the code source/permission mapping of policy object 242 is considered to have the default key. Furthermore, any received code source that does not have a key is considered to have the default key.

In step 322, the code sources listed in the policy object 242 are compared against the received code source to determine which code sources match the received code source. Control then passes to step 328.

During the comparison performed in step 322, a wild card symbol in the received code source is not considered to match any character except the wild card character. For example, the default key "*" for a received code source does not match "Z", but does match "*". In contrast, a wild card symbol in the code sources within the policy mapping matches any corresponding value in the received code source. For example, a received code source "URL1" "Z" matches a code source entry "URL1" "*".

Note that for purposes of matching a URL in step 322, that one URL may expressly or implicitly match another URL. For example, a first URL may be "d:/tmp/tmp", and a second URL may be "d:/tmp/tmp". Since the two URLs are identical, the first URL expressly matches the second. If however, the first URL is "d:/tmp/" and the second is "d:/t*", then the first URL implicitly matches the second URL.

In the present example, the received code source, "file://bank"-"clerk" matches the code sources in the code source/permission mapping corresponding to instructions 420-2, 420-3, 420-4 and 420-5.

In step 328, a determination is made of whether the received code source matched any code source in the code source/permission mapping. This determination is based on whether the search in step 322 yielded any match. If at least one match was identified, control passes to step 346. In this example, the search in step 322 yielded four matches, thus control passes to step 346.

In step 346, the most specific matching code source in the code source/permission mapping within the policy object is identified. The most specific code source is the code source whose URL and key most directly represent the received URL and key. A code source with a URL and key that exactly matches the received URL and key is the most specific code source. If no exact match exists, the most specific match depends on the degree that a particular URL directly represents the given URL. For example, for a given URL like "d:/tmp/tmp.c", a URL like "d:/tmp/tmp*.*" more directly represents the given URL than another URL like "d:/t*". Those skilled in the art will recognize that many methods can be used to determine which URL is most specific. Therefore, it is understood that the present invention is not limited to any specific method of determining which URL is more specific than another URL for a given URL.

In this example, the code source represented by instruction 420-2 exactly matches the URL and key in the received code source. Control then passes to step 358.

In step 358, an association between the received class and a protection domain containing the permissions mapped to the most specific matching code source is established. If a protection domain associated with a code source that has the most specific URL and the received key does not exist, the needed protection domain object is created. The domain mapper maintains a list of which protection domains exist and which code sources are associated with each protection domain. When a protection domain is created, it is populated with the set of permissions mapped to the most specific matching code source based on the mapping of code source/permissions in policy object 240.

Regardless of whether a protection domain is created in step 358, a mapping of the class to the protection domain is added to the mapping data structure maintained within the domain mapper 248. In this example, a mapping between class 260 and protection domain object 282 is created. Protection domain object 282 is populated with the permission corresponding to instruction 420-1.

DEFAULT PROTECTION DOMAIN

If no code sources match the received code source, control passes to step 352. In step 352, an association between the class and a default protection domain containing a set of permissions is established. Thus a received class having an unmatched code source is treated as if the class is unsigned.

One method to create a default protection domain involves logically representing the code source of the default domain with code source having a URL of "*" and the default key (i.e. "*") in the policy file. The code source that contains a URL logically represented as "*" and a key logically represented by the "*" is herein referred to as the default code source. Instructions in the policy file can represent the default protection domain by mapping the default code source to the permissions. Instruction 420-3 is an example of an instruction that maps a permission to a default protection domain.

If a protection domain associated with a default code source does not exist, then one is created. The default protection domain is created in the same manner described in step 358, except that the default protection domain is populated with permissions mapped to the default code source.

While one method of establishing a default key, a default protection domain, and associating a class with a default domain has been described, other methods are possible. Therefore, it is understood that the present invention is not limited to any specific method establishing a default key, a default protection domain, and associating a class with a default domain.

ALL MATCH SELECTION

In the "best match" permission selection approach described above, a class associated with a received code source is given the permissions that are mapped to the code source that best matches the received code source. According to an alternative approach, a class associated with a received code source is given the permissions that are mapped to all code sources that match, directly or implicitly, the received code source.

Thus the protection domain that is chosen (or created) for a new class is the protection domain associated with the permissions mapped to all of the code sources matching the received code source. For example, assume that code sources represented by instructions 420 are recognized code sources. Assume for example that a given code source has a URL or "file://bank" and a key of "clerk". The code sources represented by instruction 420-2, instruction 420-3, instruction 420-4, and instruction 420-5 each match the received code source. The protection domain chosen (or created) on the basis of the received code source will contain the permissions listed in instruction 420-2, instruction 420-3, instruction 420-4, and instruction 420-5.

REPLACEMENT OF DOMAIN MAPPER

In the embodiments described above, a particular object (domain mapper 248) is used to maintain the class-to-protection domain mappings. However, alternative embodiments may not employ a specific object for this function. For example, in other embodiments of the invention, instead of storing the mapping of classes to protection domains in a domain mapper object, the mapping is stored as static fields in the protection domain class. The protection domain class is the class to which protection domain objects belong. There is only one instance of a static field for a class no matter how many objects belong to the class. The data indicating which protection domains have been created and the code sources associated with the protection domains is stored in static fields of the protection domain class. Alternatively, a mapping between a class and protections domains associated with the class is stored as static fields in the class.

Static methods are used to access and update the static data mentioned above. Static methods are invoked on behalf of the entire class, and may be invoked without referencing a specific object.

SECURE CLASS LOADER

As mentioned above, a search is performed when an object class must be loaded. According to one embodiment of the invention, the search is performed in response to executing code which itself belongs to a class.

Figure 6:
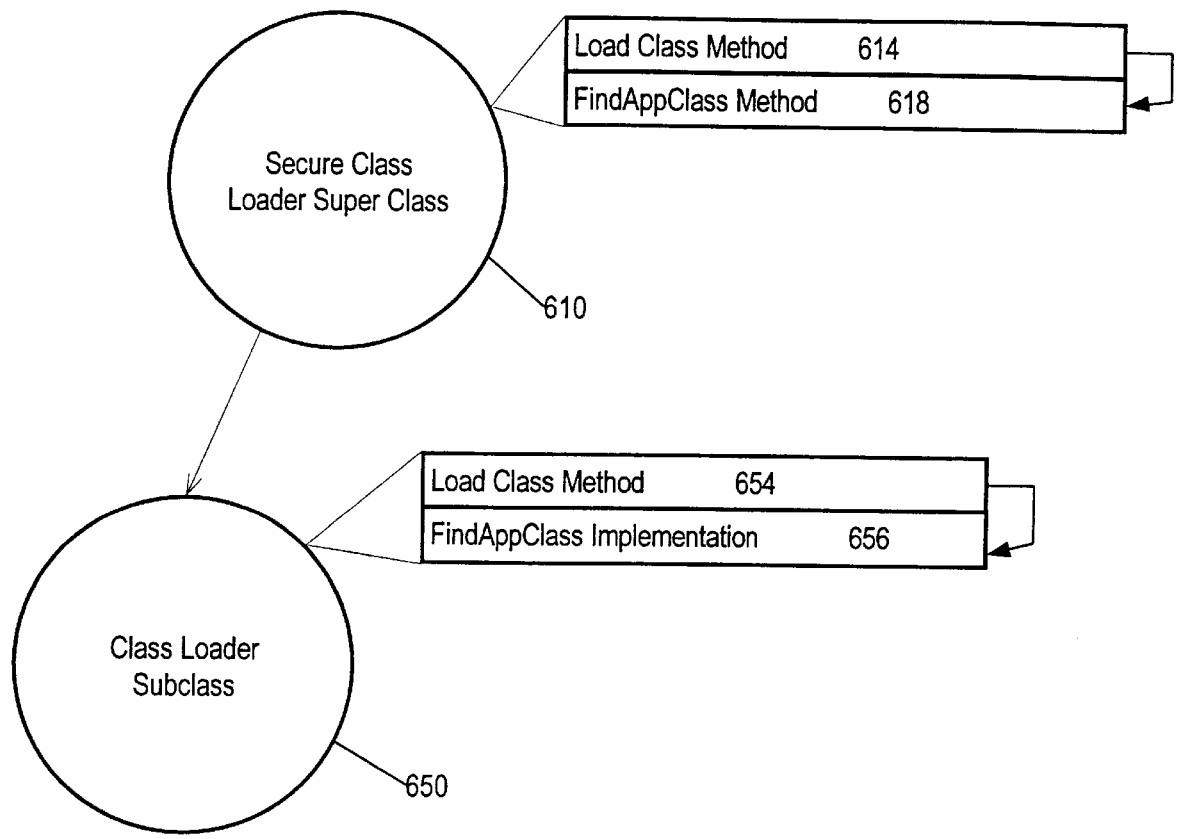
FIG. 6 is block diagram showing a secure class loader super class and a secure class loader subclass in accordance with one embodiment of the present invention.

Specifically, FIG. 6 illustrates a secure class loader super class 610. According to one embodiment, an object belonging to secure class loader super class 610 (or a subclass of the secure class loader super class 610) is used to load classes. The concept of subclasses, and the related concept of inheritance, are described in greater detail in Appendix I.

In one embodiment of the invention, a class is only loaded using a secure class loader object. A secure class loader object is an object that belongs to the class secure class loader 610 or a subclass of secure class loader 610 class. Classes used to create objects which are used to load classes are herein referred to as class loaders.

Referring to FIG. 6, secure class loader 610 includes a "load class" method 614. According to an embodiment of the invention, the load class method has one string parameter which represents a class name. The load class method is invoked to resolve and load the class identified by the input class name. The load class method may, for example, search for a class in accordance with the steps shown in FIG. 5 for resolving and loading a class.

According to an embodiment of the invention, load class method 614 is a "final" method. A final method cannot be overridden in a subclass of the class that defines the method as final. The "final" designation may be used to prevent users from modifying the portion of the search sequence that is necessary for security (e.g. checking the loaded classes first, then the system classes). The portion of a search sequence that is not necessary for security may be specified in a non-final "FindAppClass" method 618 that is called by the load class method 614 when a class in not found among the loaded and system classes.

The default operation of the FindAppClass method 618 may be specified in the secure class loader 610 super class. According to one embodiment, the default operation may be to perform the steps 524, 528 and 532 illustrated in FIG. 5. Alternatively, the default operation may be to search the default pathway before searching in user specified sources, or to search in user specified sources without searching any default pathway. Yet another alternative is for the default FindAppClass operation to perform no additional searching. Because the FindAppClass method is non-final, a user may override the default operation of the method.

The FindAppClass method 618 is invoked in the order dictated by the implementation of the load class method 614. Because load class method 614 is a final method, the order in which the FindAppClass method 618 is invoked cannot be modified by a subclass. Thus, the ability of a user to override the default implementation of the FindAppClass method in a subclass does not allow a user to alter the portion of the search sequence that is necessary for security.

To override the default implementation of the FindAppClass method 618, a secure class loader subclass 650 may be defined and an alternative FindAppClass implementation 656 provided.

The load class method 654 (which is identical to load class method 614) of an object belonging to the secure class loader subclass 650 may then be used to load a class of a given name. The load class method 654 invokes FindAppClass method 618 if the class is not found during the searches performed by the load class method 654. The FindAppClass method 618 then executes the searches specified by the user in the subclass implementation 656 of the FindAppClass method 618.

To illustrate the use of the secure class loader, assume that two classes have conflicting names and that one class is defined by code in a default source and the other by code in a remote source, which is the file "http://www.bank.com/txtbox". The name of each class is TxtBox. The default source containing the class definition for a class named TxtBox is herein referred to as the default text box source, and the remote source "http://www.bank.com/txtbox" is herein referred to as the remote text box source.

Assume that the Load Class method 614 in the class loader super class is implemented to (1) search the loaded classes, (2) search the system classes, (3) invoke the FindAppClass method, and (4) search the default source.

Assume further that the FindAppClass implementation 656 of a particular secure class loader subclass 650 searches for a class of a given name in the remote text box source and loads the class if found in the remote text box source. An object which belongs to this particular secure class loader subclass is herein referred to as a "remote bank class loader".

Assuming the above conditions, when a request to load a class with the given name TxtBox is made, a load class method of a remote bank class loader is invoked, passing in as a parameter the string "TxtBox". In step 506, the class is not found among the loaded classes. Because the determination made in step 510 is that the class is not found among the loaded classes, control passes to step 514. In step 514, the class is not found in the system class libraries. Because the determination made in step 520 is that the class is not found among the system class libraries classes, control passes to step 524.

In step 524, in order to perform a search in the set of classes specified by a user, the FindAppClass method of the remote bank class loader is invoked. A class having the name TxtBox is found in the remote text box source. In step 532, the determination made is that a class was found thus control passes to step 540, where the found class is loaded.

Assume instead that the remote bank class loader subclass provides an implementation for the FindAppClass method that does not perform any searching. In this case no search would be performed in step 524 and the determination made in step 528 is that no class was found in the sources specified by a user. Thus control would pass to step 532.

In step 532, a class of the given name TxtBox is found in the default textbox source. In step 534, the determination made is that a class was found in the default pathway, thus control passes to step 540. In step 540, the TxtBox class is loaded from the default text box source.

In one embodiment of the present invention, a secure class loader performs the steps shown in FIG. 3 for choosing a protection domain. Other methods for loading classes are also defined by the secure class loader class. For example, one method loads a class from a source designated by particular URL. This method requires two string parameters. One parameter specifies the class name and the other a URL. Another method loads a class from a particular file, and requires two string parameters. The first specifies a class name and the second a particular file. These other load class methods follow the steps shown in FIG. 5.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

APPENDIX I

OBJECT ORIENTATION AND INHERITANCE

Sometimes an application requires the use of classes that are similar, but not identical. For example, the classes used to model both dolphins and dogs might include the attributes for the nose, mouth, length and age. However, the dog class may require a hair color attribute, while the dolphin class requires a fin size attribute.

To facilitate programming in situations in which an application requires multiple similar attributes, object oriented programming supports "inheritance". Without inheritance, a programmer would have to write one set of code for the dog class, and a second set of code for the dolphin class. The code implementing the attributes and methods common to object classes would appear redundantly in both classes. Duplicating code in this manner is very inefficient, especially when the number of common attributes and methods is much greater than the number of unique attributes. Further, code duplication between classes complicates the process of revising the code, since changes to a common attributes will have to be duplicated at multiple places in the code in order to maintain consistency between all classes that have the attribute.

Inheritance allows a hierarchy to be established between classes. The attributes and methods of a class automatically become attributes and methods of the classes that are based upon the given class in the hierarchy. For example, an "animal" class may be defined to have nose, mouth, length and age fields, with associated methods. To add these attributes and methods to the dolphin and dog classes, a programmer can specify that the dolphin and dog classes "inherit" the animal class. A class which inherits its attributes and methods from another class is said to be a subclass of the other class. The other class, the class from which the subclass inherited its attributes and methods, is said to be a parent class. In this example, the dolphin and dog classes are "subclasses" of the animal class, and the animal class is a parent class of the dog and dolphin classes.

The code for the inherited attributes and methods is located in the parent class and is not duplicated in any subclasses. The subclasses only contain the code for attributes and methods that supplement or override the attributes and methods of the parent class. Consequently, all revisions to a parent class automatically apply to all subclasses. For example, if the attribute "age" is defined as an integer in the animal class and is not overridden in the dog and dolphin classes, then the dog and dolphin classes will include an integer to store an age value. If the animal class is revised so that "age" is defined as a real number, then the dog and dolphin classes will automatically include a real number to store an age value.

Note a third or greater level in a hierarchy of a classes can be established. A given class can inherit attributes and methods of a class that is itself of a subclass of another class. All classes above a particular class in a hierarchy are said be a super class to that particular class. Thus a parent class is a super class to its subclasses, and a super class to any class inheriting from a subclass of that parent class.

What is claimed is:

1. A method for providing security, the method comprising the steps of:
   receiving data that identifies a class;
   searching for said class in one or more predetermined sequences of sources of code; and
   if said class is found and not currently loaded, then:
      loading said class from a particular source of code; and
      selecting a set of permissions to associate with said class based on a predetermined mapping of sources of code to permissions.

2. The method of claim 1, wherein the step of selecting said set of permissions includes the step of establishing a default key as a key associated with said particular source of code if said particular source of code is not associated with any key.

3. The method of claim 2, wherein the step of selecting said set of permissions includes:
   identifying one or more sources of code in said predetermined mapping that match said particular source of code; and
   if no source of code in said predetermined mapping match said particular source of code, then establishing an association between a default set of permissions and said class.

4. The method of claim 3, further including the step of establishing an association between said class and a set of permissions mapped to one or more sources of code in said predetermined mapping that match said particular source of code.

5. The method of claim 1, wherein said step of searching includes the step of invoking a first method that cannot be overridden, said first method performing a search of a first set of sources of code.

6. The method of claim 5, wherein said step of searching includes th e step invoking a second method that can be overridden, said second method performing a search of a second set of zero or more sources of code.

7. The method of claim 1, wherein the step of searching for said class in one or more predetermined sequences of sources of code includes the steps of:
   determining whether said class is loaded;
   if said class is not loaded, then searching for said class in a first set of sources of code; and
   if said class is not found in said first set of sources of code, then searching for said class in a second set of sources of code specified by a user.

8. The method of claim 7, further including the step of searching for said class in a default set of sources specified by a default pathway if said class is not found in said first set of sources.

9. The method of claim 7, wherein the step of determining whether said class is loaded and the step of searching for said class in said first set of sources of code is performed by executing a first method whose implementation is defined in a super class, wherein said implementation of said first method may not be overridden by a subclass of said super class.

10. The method of claim 9, wherein the step of searching for said class in said second set of sources of code is performed by invoking a second method from said first method, wherein an implementation of said second method is defined by said subclass of said super class.

11. A computer-readable medium carrying one or more sequences of one or more instructions for providing security, the one or more sequences of the one or more instructions including instructions which, when executed by one or more processors, cause the one or more processors to perform the steps of:
   receiving data that identifies a class;
   searching for said class in one or more predetermined sequences of sources of code; and
   if said class is found and not currently loaded, then:
      loading said class from a particular source of code; and
      selecting a set of permissions to associate with said class based on a predetermined mapping of sources of code to permissions.

12. The computer-readable medium of claim 11, wherein the step of selecting said set of permissions includes the step of establishing a default key as a key associated with said particular source of code if said particular source of code is not associated with any key.

13. The computer-readable medium of claim 12, wherein the step of selecting said set of permissions includes:
   identifying one or more sources of code in said predetermined mapping that match said particular source of code; and
   if no source of code in said predetermined mapping match said particular source of code, then establishing an association between a default set of permissions and said class.

14. The computer-readable medium of claim 13, further including sequences of instructions for performing the step of establishing an association between said class and a set of permissions mapped to one or more sources of code in said predetermined mapping that match said particular source of code.

15. The computer-readable medium of claim 11, wherein said step of searching includes the step of invoking a first method that cannot be overridden, said first method performing a search of a first set of sources of code.

16. The computer-readable medium of claim 15, wherein said step of searching includes the step invoking a second method that can be overridden, said second method performing a search of a second set of zero or more sources of code.

17. The computer-readable medium of claim 11, wherein the step of searching for said class in one or more predetermined sequences of sources of code includes the steps of:
   determining whether said class is loaded;
   if said class is not loaded, then searching for said class in a first set of sources of code; and
   if said class is not found in said first set of sources of code, then searching for said class in a second set of sources of code specified by a user.

18. The computer-readable medium of claim 17, further including sequences of instructions for performing the step of searching for said class in a default set of sources specified by a default pathway if said class is not found in said first set of sources.

19. The computer-readable medium of claim 17, wherein the step of determining whether said class is loaded and the step of searching for said class in said first set of sources of code is performed by executing a first method whose implementation is defined in a super class, wherein said implementation of said first method may not be overridden by a subclass of said super class.

20. The computer-readable medium of claim 19, wherein the step of searching for said class in said second set of sources of code is performed by invoking a second method from said first method, wherein an implementation of said second method is defined by said subclass of said super class.

21. A computer system comprising:
   one or more processors;
   memory coupled to said one or more processors;
   sequences of instructions stored within said memory which, when executed by said one or more processors, cause said one or more processors to
   (a) receive data that identifies a class;
   (b) search for said class in a predetermined sequence of sources of code; and
   (c) if said class is found and not currently loaded in the computer system, then:
      loading said class from a particular source of code, and
      selecting a set of permissions to associate with said class based on a predetermined mapping of sources of code to permissions.

* * * * *